US011992846B2

(12) United States Patent
Versnik

(10) Patent No.: US 11,992,846 B2
(45) Date of Patent: May 28, 2024

(54) INFEED PROTECTION DEVICE

(71) Applicant: BÜHLER AG, Uzwil (CH)

(72) Inventor: Thomas Versnik, Oberbüren (CH)

(73) Assignee: Bühler AG, Uzwil (CH)

( * ) Notice: Subject to any disclaimer, the term of this patent is extended or adjusted under 35 U.S.C. 154(b) by 397 days.

(21) Appl. No.: 17/609,094

(22) PCT Filed: Apr. 17, 2020

(86) PCT No.: PCT/EP2020/060845
§ 371 (c)(1),
(2) Date: Nov. 5, 2021

(87) PCT Pub. No.: WO2020/224933
PCT Pub. Date: Nov. 12, 2020

(65) Prior Publication Data

US 2022/0212198 A1 Jul. 7, 2022

(30) Foreign Application Priority Data

May 7, 2019 (EP) .................................... 19172913

(51) Int. Cl.
*B02C 4/28* (2006.01)
*B02C 4/04* (2006.01)
(Continued)

(52) U.S. Cl.
CPC ................ *B02C 4/286* (2013.01); *B02C 4/04* (2013.01); *B02C 4/30* (2013.01); *B02C 4/36* (2013.01)

(58) Field of Classification Search
CPC .... B02C 4/30; B02C 4/40; B02C 4/04; B02C 4/36; B02C 4/286
See application file for complete search history.

(56) References Cited

U.S. PATENT DOCUMENTS 3,332,630 A * 7/1967 Verdier ..................... B02C 4/28 241/226

FOREIGN PATENT DOCUMENTS

CH 690228 A5 6/2000
CN 102225346 A 10/2011
(Continued)

OTHER PUBLICATIONS

European Search Report Corresponding to 19172913.6 dated Dec. 12, 2019.
(Continued)

*Primary Examiner* — Bobby Yeonjin Kim
(74) *Attorney, Agent, or Firm* — Finch & Maloney PLLC

(57) ABSTRACT

An infeed protection device for a rolling mill, comprising a housing and a plurality of parallel rotating rollers. A product infeed is formed by two of the rollers which rotate about rotational axes arranged parallel with one another and arranged at an adjustable roller space with respect to one another. The infeed protection device comprises a profile which is arranged parallel with the rollers forming the product infeed and extends over the length of the product infeed. In an infeed direction of the rotating rollers, the profile is upstream of the rollers forming the product infeed. At least one vertical through-opening is formed in the profile. A space is formed between the profile and the rollers. The infeed protection device further comprises a holder for fastening the infeed protection device to the housing of the rolling mill.

11 Claims, 4 Drawing Sheets

(51) Int. Cl.
*B02C 4/30* (2006.01)
*B02C 4/36* (2006.01)

(56) References Cited

FOREIGN PATENT DOCUMENTS

| | | | | | |
|---|---|---|---|---|---|
| CN | 102513181 | A | | 6/2012 | |
| CN | 104190496 | A | | 12/2014 | |
| CN | 107597270 | A | | 1/2018 | |
| CN | 207805704 | U | | 9/2018 | |
| DE | 20 2015 101 947 | U1 | | 10/2015 | |
| DE | 202015101947 | U1 | * | 10/2015 | ............... B02C 4/04 |
| GB | 1 008 065 | | | 10/1965 | |

OTHER PUBLICATIONS

International Search Report Corresponding to PCT/EP2020/060845 dated Jul. 2, 2020.
Written Opinion Corresponding to PCT/EP2020/060845 dated Jul. 2, 2020.
Japanese Office Action corresponding to application No. 2021-565934 which dated Dec. 6, 2022.
Chinese Office Action corresponding to application No. 202080032782.0 which dated Jul. 1, 2022.

* cited by examiner

INFEED PROTECTION DEVICE

The present invention relates to an infeed protection device for rolling mills, comprising a plurality of rotating rollers, in particular triple roller mills.

Triple roller mills are suitable for various fields of application. The mills are designed for processing masses having medium to high viscosity. For producing printing inks or printer's colors of all kinds, paints for artists, industry and buildings, toners, but also coating masses, fats and products for the electronics and cosmetics industries, triple roller mills can be used. During the operation of rolling mills, a substance or a mixture of substances is supplied and dispersed between two rotating rollers between which a gap is formed. The finished product is removed and discharged at the roller at the product output side, for example by means of a scraper.

As a rule, a rolling mill also comprises various safety mechanisms in order to guarantee operational safety during operation or cleaning. For example, one or more emergency switches can be provided on the housing for being able to stop the machine quickly if necessary. This can be realized, for example, by means of an AC converter having a dynamic braking system. Moreover, a cover can be provided, which closes the machine completely and thus prevents operators from being hurt by the machine or objects from entering the product infeed.

For example, the prior art discloses safety covers which are attached over a supply opening of the rollers. When the safety cover is closed, however, it is difficult or even impossible to supply or distribute a product and to recognize a dry running condition. Therefore, the work is performed with the rollers being open in order to be able to supply a product or distribute it over the entire width of the roller. However, there is the risk that objects or body parts get between the rollers. Therefore, it is the object of the present invention to guarantee an improved operational safety in order to protect operators and devices.

This object is achieved by an infeed protection device according to independent claim 1. The dependent claims describe preferred embodiments.

In particular, the invention comprises an infeed protection device for a rolling mill, comprising a housing and a plurality of parallel rotating rollers, wherein a product infeed is formed by means of two of the rollers which rotate about rotational axes arranged in parallel with one another and are arranged at an adjustable roller space with respect to one another. The infeed protection device comprises a profile which is arranged in parallel with the rollers forming the product infeed and extends over the length of the product infeed. In an infeed direction of the rotating rollers, the profile is upstream of the rollers forming the product infeed. At least one vertical through-opening is formed in the profile. A space is formed between the profile and the rollers. The infeed protection device further comprises a holder for fastening the infeed protection device to the housing of the rolling mill.

The infeed protection device can further comprise two bars being arranged in parallel with the rollers forming the product infeed, wherein, in an infeed direction of the rotating rollers, the bars are upstream of the rollers forming the product infeed. A gap can be formed between the bars. Moreover, a space can be formed between the bars and the rollers.

The bars preferably have a rectangular cross-section. The space between the bars and the rollers can be adjustable. The infeed protection device further comprises a removable spatula for cleaning the rollers and/or the bars and/or for distributing a product on the rollers. The spatula is preferably configured such that it can be arranged in the gap between the bars.

The infeed protection device is preferably made of a stainless metal. Moreover, the infeed protection device can be coated or polished in order to prevent a product from adhering to the infeed protection device. The bars can be connected to the holder by means of a rod assembly. Preferably, an angle between the rod assembly and the holder is smaller than or equal to 90°. The infeed protection device can further comprise a device for stopping the rolling mill in case the infeed protection device has been positioned improperly or is missing. The device for stopping the rolling mill can be configured as a magnetic switch.

The invention further comprises a rolling mill with an infeed protection device according to the present invention. The rolling mill can further comprise two buttons which, when being operated simultaneously, start an empty running mode with reduced rotational speed of the rolling mill. The buttons are preferably spaced from each other in such a manner that they cannot be operated simultaneously by one hand.

The invention further comprises a method of retrofitting the infeed protection device according to the present invention to a rolling mill. For this purpose, a rolling mill is provided, the infeed protection device is attached thereto by means of the holder and the space between the rollers and the bars is adjusted by means of the height adjustment device.

The present invention will be discussed in more detail based on the drawings. In the drawings, equal reference numbers are used for equal or similar elements.

Figure 1:
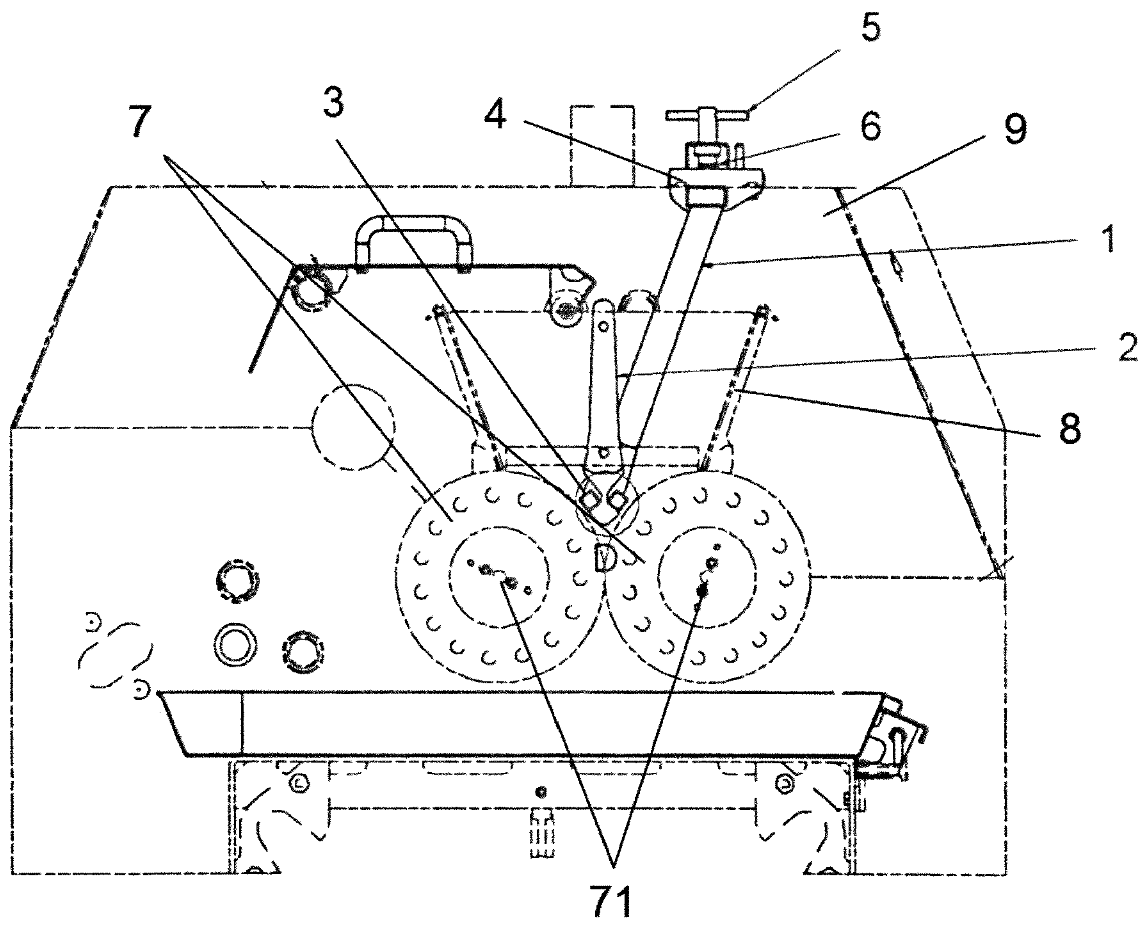
FIG. 1 shows a cross-sectional view of a rolling mill with an infeed protection device according to an embodiment of the invention.

FIG. 1 shows a partial side view of a rolling mill according to an embodiment of the invention. For the purpose of clarification, only two rollers 7 are shown, but more than two rollers can be provided depending on the field of application. The rolling mill comprises a housing 9 as well as the rollers 7 which each rotate about a rotational axis 71 and the space between which can be adjustable. Furthermore, a supply opening or product infeed 8 is provided, which is formed between two rollers 7 and through which the starting substance or the mixture of substances is supplied to the rollers 7 and dispersed therebetween. For this purpose, neighboring rollers 7 are operated in a counter-rotating manner and, as a rule, filled from the top. The product infeed 8 can also comprise further means for guiding the product between the rollers 7 such as, for example, a funnel-shaped arrangement.

When dispersing, e.g., fats or highly viscous substances, they might adhere to the side walls of the rolling mill so that an operator's intervention becomes necessary. Therefore, in accordance with the invention, there is provided an infeed protection device which guarantees the highest possible safety when working with the open machine. During operation it is thus easily possibly to distribute the product on the rollers 7 using the spatula or add further product or to detect a dry running condition without endangering the operators.

The infeed protection device comprises a profile which is arranged in parallel with the rollers 7 forming the product infeed 8 and extends over the length of the product infeed 8. In an infeed direction of the rotating rollers 7, the profile is upstream of the rollers 7 forming the product infeed 8. At least one vertical through-opening is formed in the profile. A space d is formed between the profile and the rollers 7. The infeed protection device further comprises a holder 4 for fastening the infeed protection device to the housing 9 of the rolling mill.

It is also possible that a plurality of spaced-apart through-openings are provided in the profile. They can allow product flow or product circulation, as will be described below with reference to FIG. 2. The through-openings can be realized, e.g., as slits or as holes, but also other shapes might be suitable. Preferably, the profile extends over the entire length of the product infeed 8, but it can also be shorter.

According to a preferred embodiment, which is exemplarily shown in FIG. 1, the infeed protection device comprises two bars 3 which are arranged in parallel with the rollers 7 forming the product infeed 8 and which, in the infeed direction, are upstream of the rollers 7. In other words, the through-opening extends over the entire length of the profile of the infeed protection device. In the following, as well as in the drawings, reference will be made to this embodiment. A gap s is formed between the bars 3. The gap s is preferably small enough for preventing fingers or objects from getting between the rollers 7 and wide enough for allowing product supply.

Figure 2:
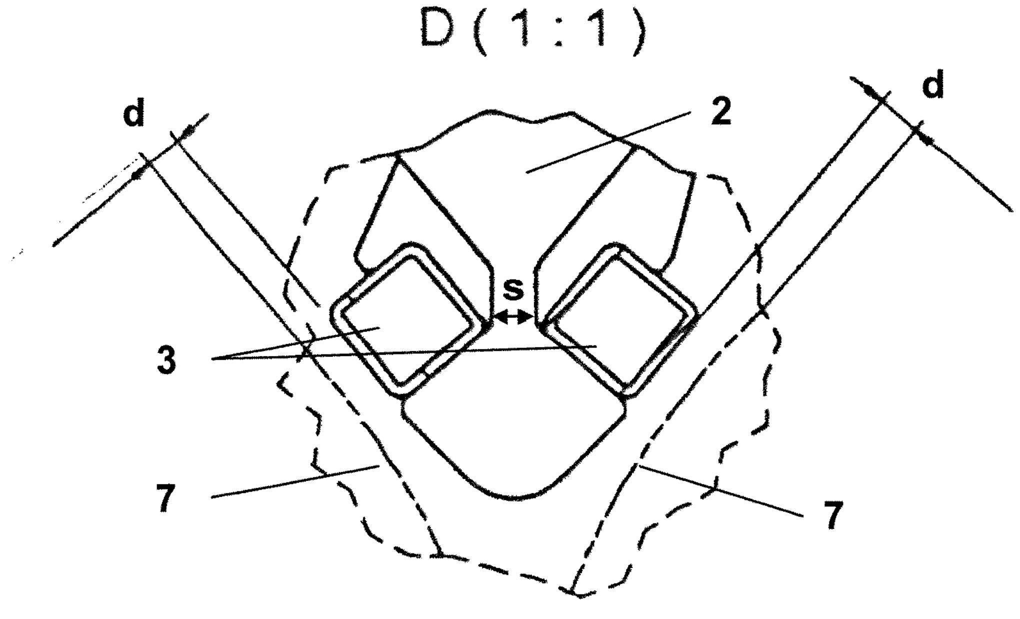
FIG. 2 shows a detailed view of the infeed protection device of FIG. 1.

The profile or the bars 3 can be attached directly to the housing 9 at the side walls of the product infeed 8 or can be inserted by means of a rod assembly 1 and a holder 4 from the top into the product infeed 8 and attached thereto. Thus, a space d is formed between the profile or the bars 3 and the respective roller 7, as shown in FIG. 2. Preferably, this space d can be adjusted by a height adjustment device 6. The height adjustment device 6 can be adjusted, for example, by rotary handles 5 which, when being rotated, move the entire infeed protection device upwards or downwards or by spacer disks. Thus, it also becomes possible to supply the product to the rollers 7 through the space d. The space d is preferably between 3 and 10 mm, preferably 4 to 6 mm and particularly preferably 5 mm.

A level probe can be provided over the gap between the rollers 7 or the product infeed 8 in order to monitor the filling of the product. The level probe can be realized, e.g., as an ultrasonic probe. If the probe is arranged perpendicularly over the product infeed 8, it might be suitable that the rod assembly 1 is arranged at an angular offset with respect to the holder 4 in order not to interfere with the level probe. Preferably, the angle between the rod assembly 1 and the holder 4 and/or between the rod assembly 1 and a horizontal plane through the holder 4 is thus less than 90°.

FIG. 2 shows a detailed view of the section D of FIG. 1. FIG. 2 in turn shows the embodiment with two bars 3 which are arranged in parallel and between which a gap s is formed. However, the statements are analogously also applicable to an infeed protection device comprising only one profile. During operation, the product is supplied through the space d by rotation of the rollers 7. Then, it can exit upwardly through the through-openings of the infeed protection device or the gap s and can slide over the profile or the bars 3 in the direction of the space d, in order to be in turn supplied to the rollers 7. The upper side of the profile or the bars 3 facing away from the product infeed is, in other words, preferably convex or tapering upwardly so that product exiting through the gap s or the through-openings can slide down and be supplied to the rollers 7. In particular, it is advantageous that no horizontal surface is formed on the upper side so that no product adheres thereto or is retained thereon. Thus, the product circulates around the infeed protection device. It turned out that rectangular profiles of the bars 3 lead to the best results in view of the adherence of the product, i.e. that clearly less product adheres to rectangular profiles as compared to flat profiles. In particular, it is advantageous that one tip of the rectangular profile points in the direction of the product infeed 8 and one tip points in the opposite direction to the top. Thus, a roof-shaped structure is formed on the upper side. Moreover, when the product circulates, a high pressure might be exerted on the infeed protection device from the bottom, leading to deformation of the infeed protection device. Therefore, the relieving opening is preferably formed over the entire length of the infeed protection device. In other words, the profile consists of two or more parts. Also round profiles exhibited good properties and little adherence, but it is more difficult to clean them so that they are less preferable. The bars 3 are preferably made of stainless steel. The latter can be glass blasted and polished in order to further reduce adherence of the product thereto.

If the profile is configured as two parts with a gap s, the infeed protection device can further comprise a spatula 2 which is removably arranged in the gap s. The shape of the spatula 2 is preferably adapted to the gap s and to the shape of the bars 3. Thus, it is possible to use the spatula during regular operation or during cleaning operation in order to evenly distribute the product in the product infeed 8 or remove it from the rollers 7 and the bars 3 for cleaning the infeed protection device.

FIG. 2 also shows the removable spatula 2 for cleaning the bars 3 and/or rollers 7, which is arranged in the gap s.

Figure 3:
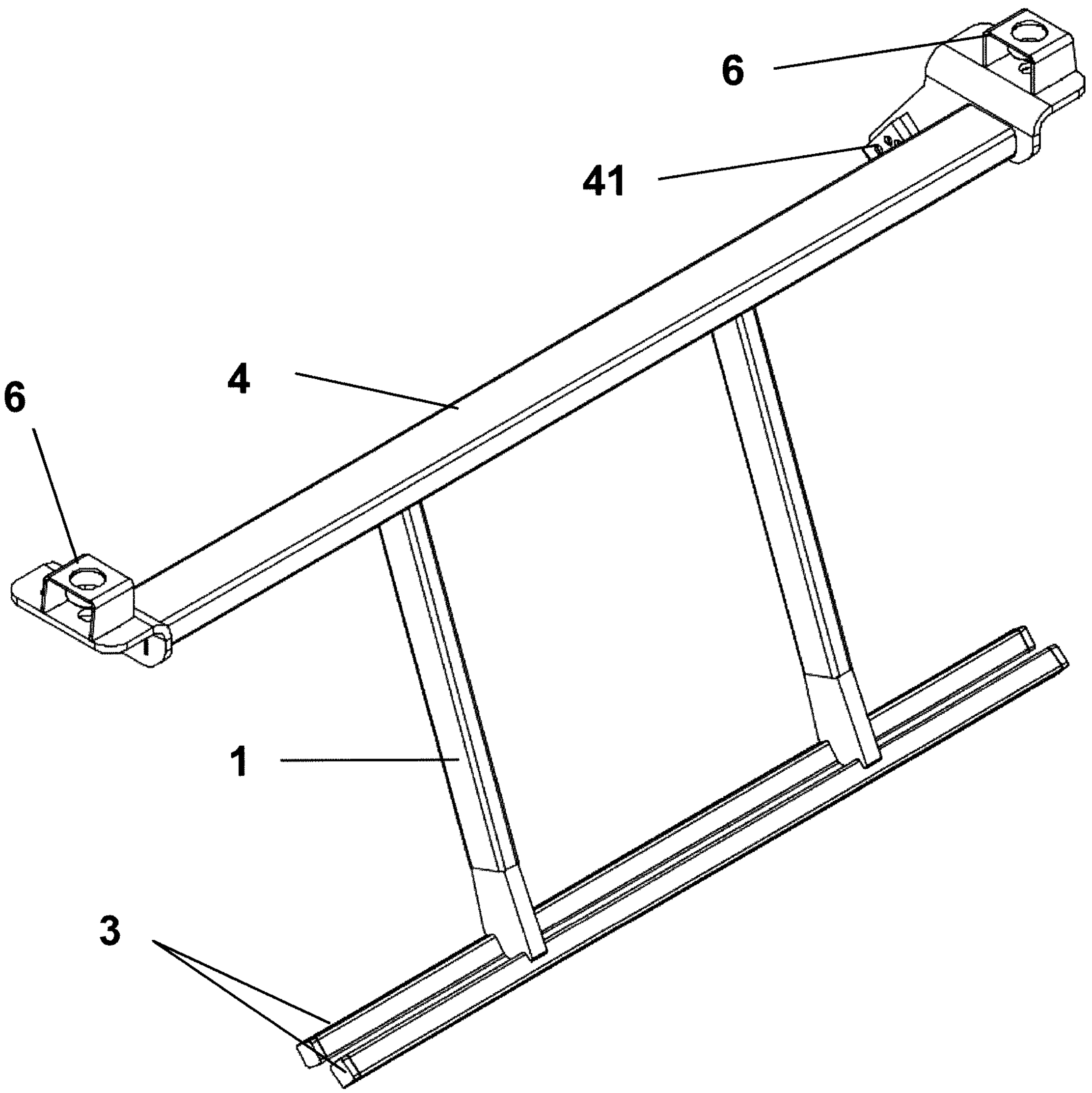
FIG. 3 shows a perspective view of the infeed protection device.

FIG. 3 shows a view of the removed infeed protection device according to an embodiment having a two-part profile. A safety mechanism 41, which guarantees that the rolling mill is operated only with the infeed protection device being installed, can be provided at one side. The safety mechanism 41 can have, for example, a corresponding counter-piece at the housing 9 and can be configured as a magnetic switch. Thus, the rollers 7 can only be rotated with the infeed protection device being installed and are stopped if the infeed protection device is removed during operation.

Figure 4:
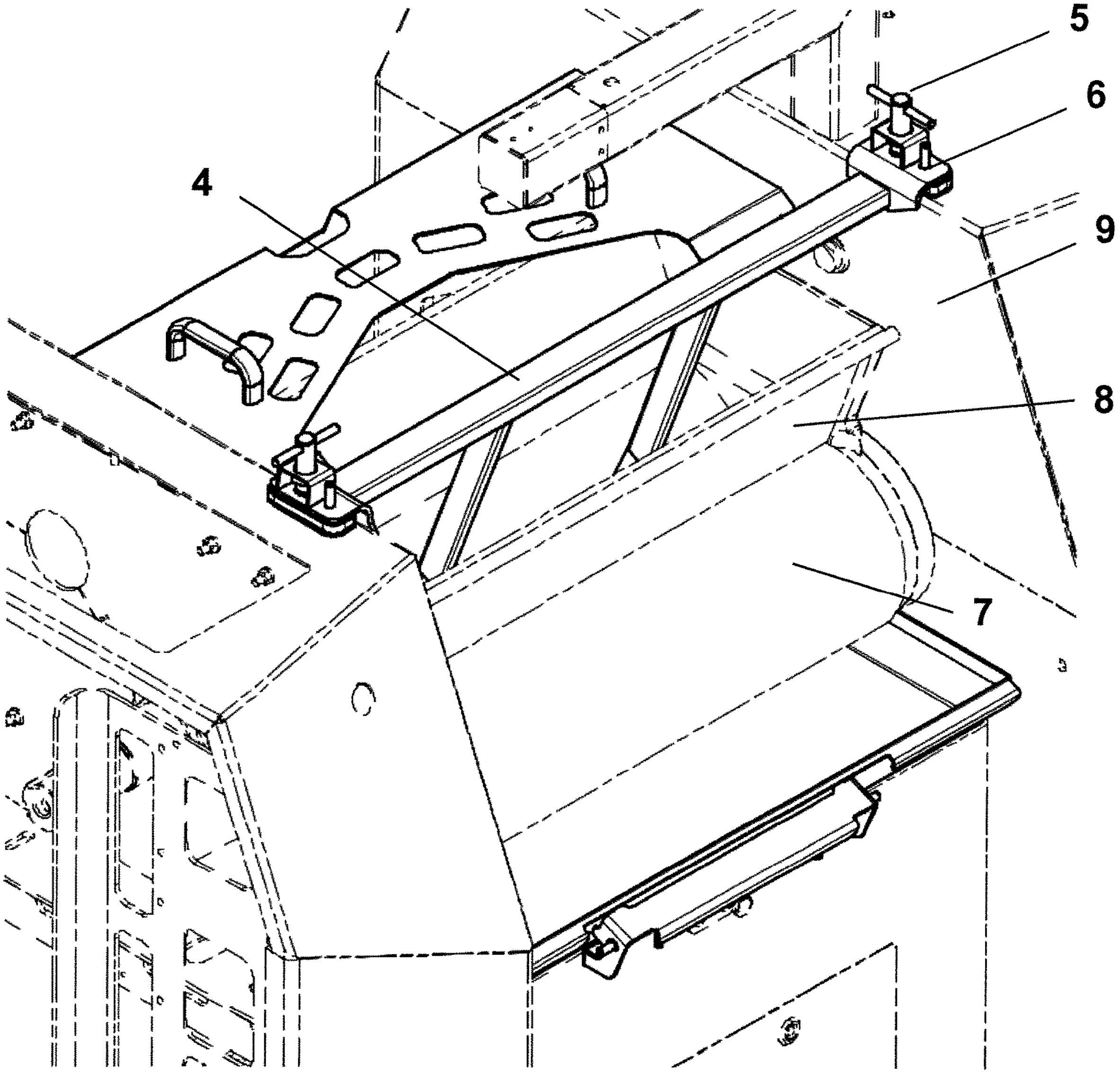
FIG. 4 shows a side view of a rolling mill with an infeed protection device according to the invention.

FIG. 4 is an inclined view of the rolling mill with installed infeed protection device as described above.

Figure 5:
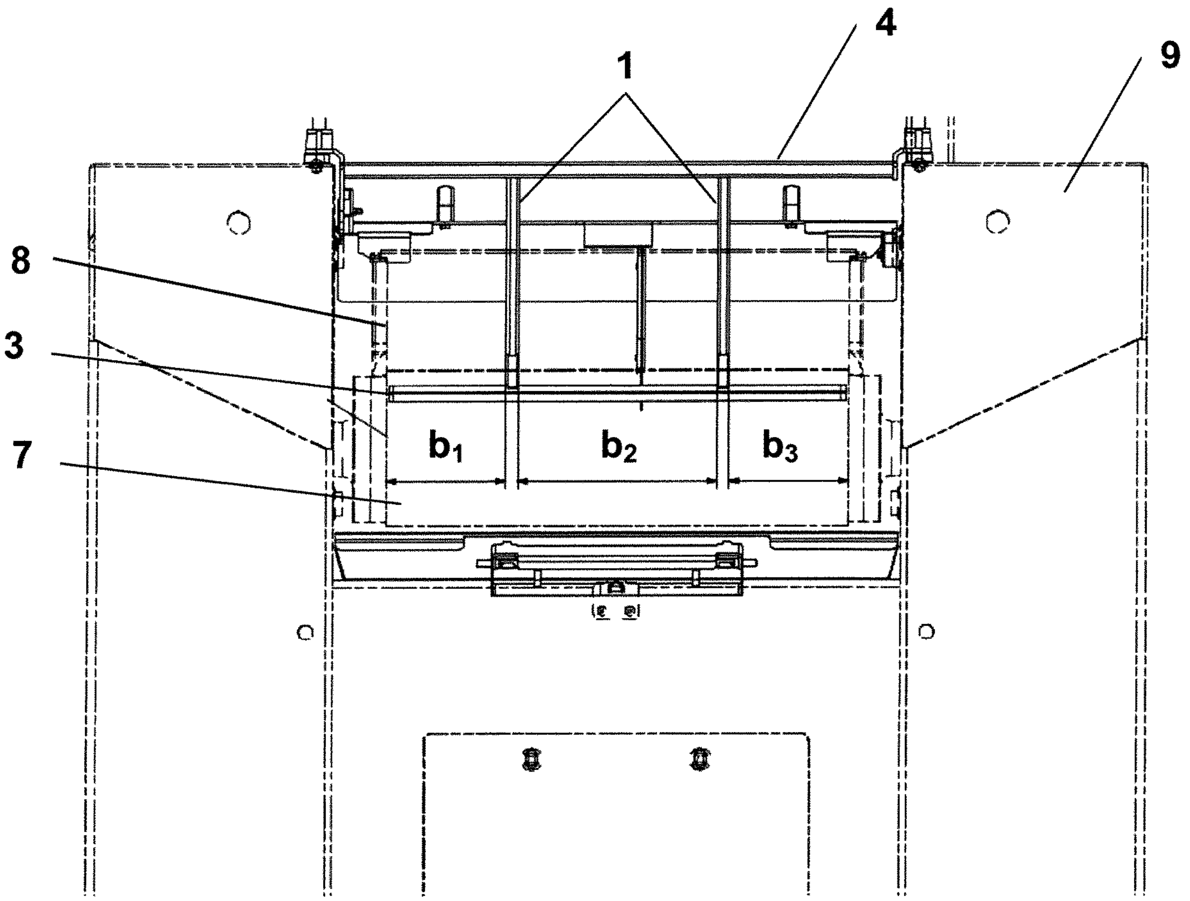
FIG. 5 shows a front view of a rolling mill with an infeed protection device according to the invention.

FIG. 5 shows a front view of a rolling mill with an installed infeed protection device. In this view, the profile or the bars 3 extend(s) over the entire length of the product infeed 8. The lateral limiting walls of the product infeed 8 are also referred to as a wedge because they limit the space between the rollers 7 in a wedge-shaped manner. Preferably, the rod assembly 1 is configured as two connecting bars between the holder 4 and the profile or the bars 3 in order to guarantee stability during operation of the rolling mill. In order to allow the product to be distributed over the entire width of the product infeed 8 by using the spatula, the spaces $b_1$, $b_2$ and $b_3$, which are formed between product infeed 8 and rod assembly 1 or between rod assembly 1 and rod assembly 1 or between rod assembly 1 and product infeed 8 preferably have a similar size. The size of the spaces $b_1$, $b_2$ and $b_3$ depends on the machine size. In particular, however, the spaces $b_1$ and $b_3$ are configured such that the operators can easily distribute the product at the sides by using the spatula.

The rolling mill can further have an empty running mode in which the rollers 7 are operated at a reduced rotational speed in order to remove remainders of the product and empty the machine. The rotational speed can be, for example, 300 to 400 rpm. Moreover, the machine can comprise a holder for suspending the infeed protection device above the product infeed 8. After having been suspended, the infeed protection device is preferably positioned higher than during operation so that the operators can easily reach the infeed protection device. Thus, the operators can easily remove remainders of the product from the infeed protection device by using the spatula and clean it. The product remainders that have fallen down or product still adhering to the rollers 7 can then be removed from the machine by using the empty running mode. For activating the empty running mode, two buttons (not shown), which have to be operated simultaneously, can be provided at the housing at the front side of the rolling mill. The buttons are preferably spaced from each other in such a manner that they cannot be operated by one hand. Also in this manner it is possible to prevent the operators from getting into the rotating rollers 7 with their fingers.

The invention further comprises a method of retrofitting an infeed protection device to a rolling mill. For this purpose, the infeed protection device is inserted into the rolling mill. Preferably, the infeed protection device is inserted into the product infeed 8, i.e. above the rollers 7, in particular above the rollers forming the product infeed. The space d between the rollers 7 and the bars 3 can be adjusted by means of the height adjustment device 6.

According to the present invention, the safety during operation can thus be improved and the operation can be simplified. In particular, it is possible to work with the open machine without the risk that the operators hurt themselves or the risk that the machine is damaged. Thus, it is more easily possible to add product or, if it adheres to the side walls, remove it therefrom by using the spatula in order to distribute the product evenly on the rollers, and it is more easily possible to recognize a dry running condition.

LIST OF REFERENCE SIGNS

1 rod assembly
2 spatula
3 bars
4 holder
41 safety mechanism
5 handle
6 height adjustment device
7 roller
71 rotational axis
8 product infeed
9 housing
$b_1$-$b_3$ space of the rod assembly
d space
s gap

The invention claimed is:

1. An infeed protection device for a rolling mill, comprising:

a housing (9), and a plurality of parallel rotating rollers (7), wherein a product infeed (8) is formed by two of the rollers (7) which rotate about rotational axes (71) arranged parallel with respect to each other and arranged at an adjustable roller space with respect to one another, the infeed protection device comprises:

a profile which is arranged parallel with the rollers (7) forming the product infeed (8) and extends over the length of the product infeed (8), in an infeed direction of the rotating rollers (7), the profile is upstream of the rollers (7) forming the product infeed (8), at least one vertical through-opening is formed in the profile, a space (d) is formed between the profile and the rollers (7), a holder (4) for fastening the infeed protection device to the housing (9) of the rolling mill, and two bars (3) arranged parallel with respect to the rollers (7) forming the product infeed (8), and a gap(s) forming the through-opening is formed between the bars (3).

2. The infeed protection device for the rolling mill according to claim 1, wherein the bars (3) have a rectangular cross-section.

3. The infeed protection device for the rolling mill according to claim 1, wherein the space (d) between the profile and the rollers (7) is adjustable.

4. The infeed protection device for the rolling mill according to claim 1, wherein the infeed protection device further comprises a removable spatula (2) for cleaning the rollers (7) and/or the profile and/or for distributing a product on the rollers (7), and the spatula is configured such that the spatula can be arranged in the gap(s) between the bars (3).

5. The infeed protection device for the rolling mill according to claim 1, wherein the infeed protection device is made of a stainless metal, and the infeed protection device is coated or polished for preventing a product from adhering to the infeed protection device.

6. The infeed protection device for the rolling mill according to claim 1, wherein the profile is connected to the holder (4) by a rod assembly (1), and an angle smaller than or equal to 90° is formed between the rod assembly (1) and the holder (4).

7. The infeed protection device for the rolling mill according to claim 1, wherein the infeed protection device further comprises a device (41) for stopping the rolling mill in case the infeed protection device is positioned improperly or is missing.

8. The infeed protection device for the rolling mill according to claim 7, wherein the device (41) for stopping the rolling mill is configured as a magnetic switch.

9. A rolling mill comprising an infeed protection device according to claim 1.

10. The rolling mill according to claim 9, wherein the rolling mill comprises two control elements which, when being operated simultaneously, are adapted to start an empty running mode with reduced rotational speed of the rolling mill, and buttons are spaced from each other in such a manner that the buttons cannot be operated simultaneously by one hand.

11. A method of retrofitting the infeed protection device according to claim 1 to a rolling mill, wherein the method comprises:

providing a rolling mill, inserting the infeed protection device over the product infeed (8), and adjusting the space (d) by a height adjustment device (6).

* * * * *